(12) United States Patent
Elie et al.

(10) Patent No.: US 8,066,548 B1
(45) Date of Patent: Nov. 29, 2011

(54) MULTI-AXES CONTOURING MACHINE AND METHOD OF USE

(75) Inventors: Edward E. Elie, Southington, CT (US); Timothy A. Marshall, Wolcott, CT (US)

(73) Assignee: Max-Tek, LLC, Milldale, CT (US)

( * ) Notice: Subject to any disclaimer, the term of this patent is extended or adjusted under 35 U.S.C. 154(b) by 1076 days.

(21) Appl. No.: 11/874,398

(22) Filed: Oct. 18, 2007

Related U.S. Application Data

(60) Provisional application No. 60/862,106, filed on Oct. 19, 2006.

(51) Int. Cl.
*B24B 41/02* (2006.01)

(52) U.S. Cl. .............................. 451/11; 451/5; 451/451

(58) Field of Classification Search .................. 451/5, 8, 451/11, 451, 360
See application file for complete search history.

(56) References Cited

U.S. PATENT DOCUMENTS

| | | |
|---|---|---|
| 4,468,160 A | 8/1984 | Campbell, Jr. |
| 4,826,127 A | 5/1989 | Koblischek et al. |
| 5,152,645 A | 10/1992 | Corsi |
| 5,220,749 A * | 6/1993 | Youden et al. .................. 451/65 |
| 5,321,874 A | 6/1994 | Mills et al. |
| 5,354,158 A | 10/1994 | Sheldon et al. |
| 5,368,425 A | 11/1994 | Mills et al. |
| 5,368,539 A | 11/1994 | Mills et al. |
| 5,401,128 A | 3/1995 | Lindem et al. |
| 5,662,568 A | 9/1997 | Lindem |
| 5,715,729 A | 2/1998 | Toyama et al. |
| 5,786,557 A * | 7/1998 | Girardin .................... 219/69.11 |
| 5,911,888 A | 6/1999 | Girardin |
| 5,938,577 A * | 8/1999 | Lindem .......................... 483/30 |
| 6,067,695 A | 5/2000 | Momoitio |
| 6,099,217 A | 8/2000 | Wiegand et al. |
| 6,155,758 A | 12/2000 | Wieland et al. |
| 6,217,496 B1 | 4/2001 | Lindem |
| 6,390,900 B1 * | 5/2002 | Susnjara ....................... 451/178 |
| 6,428,453 B1 | 8/2002 | Hoppe et al. |
| 6,557,226 B1 | 5/2003 | Landry et al. |
| 6,682,278 B2 | 1/2004 | Gronbach et al. |
| 6,931,909 B2 | 8/2005 | Tokunaga |
| 2005/0084355 A1 | 4/2005 | Zoran |
| 2005/0119096 A1 | 6/2005 | Navar |
| 2005/0172467 A1 | 8/2005 | Hamann et al. |

* cited by examiner

*Primary Examiner* — Robert Rose
(74) *Attorney, Agent, or Firm* — Doherty Wallace Pillsbury & Murphy, PC

(57) ABSTRACT

A multi-axes contouring machine for contouring a workpiece within a cavity of a main frame by moving a machining part along one or more axes simultaneously to the movement of the workpiece along one or more different axes. In an exemplary embodiment, the machining part simultaneously moves along an X and Y axis, while a workpiece moves along a Z axis. Here, the main frame comprises two adjacent side walls each having an opening cut out. A first carriage is attached to one of the side walls to move in the X direction, and a second carriage is attached to the first carriage to move in the Y direction. The machining part is actuated by the X and Y axes-oriented carriages. On another side wall, a carriage is attached to move in a Z direction, and the workpiece is actuated by the Z axis-oriented carriage.

9 Claims, 6 Drawing Sheets

MULTI-AXES CONTOURING MACHINE AND METHOD OF USE

CROSS REFERENCE TO RELATED APPLICATIONS

This application claims the benefit of U.S. Provisional Application No. 60/862,106 filed on Oct. 19, 2006.

BACKGROUND OF THE INVENTION

1. Field of the Invention

The present invention relates to a multi-axes contouring machine. More specifically, the invention relates to a contouring machine having machining parts capable of motion along multiple axes whereby the machining parts can move simultaneously to each other to efficiently machine and tool a workpiece. The inventive device is particularly advantageously used in the field of superabrasive machining.

2. Background

Superabrasive machining is a relatively new machining discipline which employs high pressure coolants, and which requires high accuracy machines, stiff machine structures, vibration dampening, and machining chip and coolant disposal. Superabrasive machining is currently accomplished using machines comprising a conventional C frame construction. Under this construction, the machine has a base structure. Mounted on the base is a table comprised of an X axis carriage, a motor, and wiring. Also mounted on the base is a column which usually comprises Y and Z axes carriages, motors, wiring, a spindle, a spindle drive motor, and a cutting device.

The conventional C frame construction machine also has an enclosure which contains a coolant. The machining area and the axes components are inside this enclosure. Accordingly, the C frame construction puts the machine's axes and the electrical support systems inside the enclosure, thereby subjecting these various components to the coolant, chips, and heat which are generated from the machining process.

Another problem associated with the C frame construction relates to force. With the basic structure of the conventional C frame machine, when a force is applied to the cutting device the force is transmitted through several components of the machine, all of which deflect when exposed to the force, thereby, allowing the gap between the cutting device and the table to open as the force is increased. To counter this spreading force, each machine component must be built to resist the forces transmitted through them. This results in a machine having a massive structure. This increased size of the machine, however, has become an issue of concern as the cost of machines, cost of factory space, and the distance the worker has to walk in a cellular layout affects the economics of manufacturing.

SUMMARY OF THE INVENTION

The above problems and difficulties are alleviated by a multi-axes contouring machine capable of holding and moving a workpiece along at least one axis while simultaneously holding and moving a machining part along at least one other axis. The machine comprises a main frame body, which is preferably shaped as a cube having four vertical walls joined together so as to delimit a square space all these walls being immovably attached to the same base forming the lower face of the cube and to the horizontal element with an opening cut out in it forming the upper face of the cube. A first carriage is attached to a first side wall of one of the side walls to move in an X direction. On another side wall, which is adjacent to the first side wall, a second carriage is attached to move in a Z direction. Additionally, a third carriage may be attached to the first carriage to move in a Y direction. In an exemplary embodiment, the first carriage, and, when used, the third carriage hold a machining part, such as, for example, a grinding wheel. Accordingly, based on the axes of movement of the first and third carriages, the machining part may be moved, and hence, may machine a workpiece along the respective X and Y axes.

Furthermore, in an exemplary embodiment, the second carriage holds the workpiece that is machined by the machining tool, thereby, eliminating the traditionally used work table. Accordingly, the part may be moved along the Z axes simultaneously to the movement of the machining parts along the X and Y axes.

The present invention will demonstrate that, unlike machines of the prior art, the cutting area is inside the machine structure which contains the cutting fluids and machining chips, and does not require a work table. Furthermore, the X-, Y- and Z-axes moving carriages, along with the carriages' respective electrical motors, are not in the contained area and are, therefore, not subject to the cutting environment. This segregation of the components eliminates the contamination of the electrical and mechanical components from cutting fluids and cutting chips which reduces maintenance and allows for easier access for maintenance.

Additionally, the contouring machine of the present invention is suited to be sized to the workpiece that it will machine by varying the size of the main frame of the contouring machine. For example, a part one inch square can be manufactured by a machine with a smaller footprint than a part 12 inches square. This can be accomplished by the ability to simply increase or decrease the size of the main structure and supporting equipment without degrading the basic machine structure.

The advantages to the various embodiments of the multi-axes contouring machine disclosed herein include:

- decreasing the size of the contouring machine, thereby reducing the overall footprint of the machine such that it takes up less space in a factory;
- directing the coolant or lubrication fluid so that its use does not contaminate the electrical and mechanical components of the machine, and the fluid can be applied directly where it is needed;
- increasing the rigidity, and, hence the security, of the main frame as compared to the conventional structures, such as, the typical "c" structure or hexapod structure; and
- easing the service, repair and maintenance of the machine as the open structure of the machine facilitates easy access to the various parts of the machine.

It will further be shown that an exemplary application of the contouring machine of the present invention is in the area of superabrasive machining.

Other objects and advantages of the present invention will become obvious to persons of ordinary skill in the art, and it is intended that these objects and advantages, are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated.

DETAILED DESCRIPTION OF THE INVENTION

Figure 1:
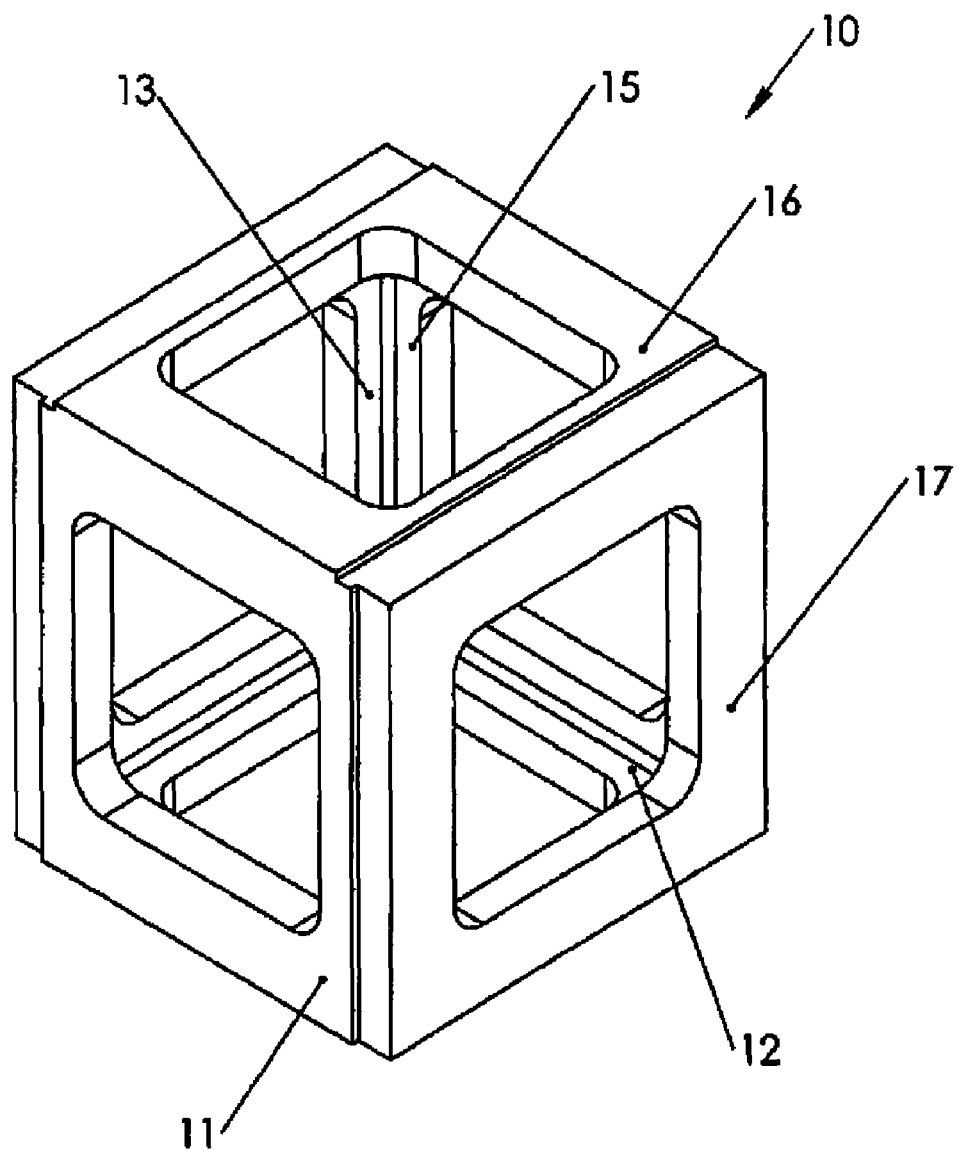
FIG. 1 is a schematic illustrating an exemplary main frame of the present invention.

The present invention is directed towards a contouring machine capable of providing for the movement of a machining part, particularly a machining part used in superabrasive machining, such as, for example, super abrasive grinding wheels, over one or more axes of motion to form articulate surfaces on a workpiece, wherein the workpiece may be held and moved by the contouring machine simultaneously to the movement of the machining part. Although the invention is ideally suited to machining with superabrasive tools, the machine can be utilized to machine with more conventional tools, such as, for example, vitrified grinding wheels, milling cutters, drills, and the like.

The machine is preferably used to form articulate surfaces on a workpiece, wherein exemplary workpieces include, for example, blades, vanes, nozzle segments, blade root forms, and miscellaneous fuel handling components. However, the invention is by no means limited to these specifically named workpieces; rather, the inventive contouring device may also be used to machine simple surfaces found on parts in automotive, medical, jewelry, and other industries using conventional grinding and machining techniques.

In its simplified form, the inventive contouring machine comprises a main frame comprising two adjacent sides which support an upper face and a base. The two sides, and preferably the main frame and/or the base, comprise cutouts for the insertion of machining parts, workpieces, peripheral machining parts, and the like into a cavity of the main frame. Each of the two adjacent sides holds one or more carriages which are movable, wherein one of the sides holds a carriage that is movable along an X axis, and the adjacent side holds a carriage that is movable along a Z axis. Furthermore in another exemplary embodiment, the carriage that moves along the X axis may hold a carriage that is movable along a Y axis. To accomplish holding of the carriages, the two adjacent sides of the main frame may comprise rails, and the respective carriages may comprises flanges adapted to securely grip the rails. Additionally, the X axis-oriented carriage may also comprise rails, and the respective Y axis-oriented carriage may comprise flanges adapted to securely grip the rails located on the X axis-oriented carriage.

Alternatively, in an exemplary embodiment, one of the sides may hold a carriage that is movable along a Y axis, and the adjacent side may hold a carriage that is movable along a Z axis. The carriage that moves along the Y axis may hold a carriage that is movable along an X axis.

Where rails are used in any of the embodiments described herein, the position of the rails preferably conforms to the American National Standards Institute machine axis layout labeling standards for Y and Z axes orientations. Additionally, the rails can be constructed from several commonly available motion techniques. Such techniques may include, for example, at least one of linear roller way rails and cars, e.g., Schneeberger or equivalent; linear ball way rails and cars, e.g., THK or equivalent; a round guide and bearing pack guide way system, e.g., Thompson or equivalent; a hydrostatic custom designed rail system; and commonly used box way systems.

In use, then, a workpiece, i.e., the part to be machined and contoured, may be positioned in communication with the Z axis-oriented carriage, and the machining part, i.e., the part used to machine the workpiece, may be positioned in communication with the X axis-oriented carriage, and when used, the Y axis-oriented carriage, to effect the simultaneous movement, and, hence, machining, of the workpiece along two or more axes of motion.

The invention will be described with reference to the figures, wherein it is to be understood that the figures are illustrative only, and that the invention shall not, therefore, be limited to the specific embodiments shown in the figures, but shall also include modifications and variations thereto.

FIG. 1 is a schematic illustrating an isometric view of a main frame 10 of the machine. Main frame 10 is in the shape of a cube. Its base 12 is constituted by the lower face of this cube. The four sides 11, 13, 15, and 17, each made up of one of the lateral faces of this cube, are cut out to a large extent while retaining, along the edges of the cube, four pillars on which an upper face 16 rests. Main frame 10 may also be of any other polygonal shape such as a triangle, pentagon, hexagon, etc., and may also be circular in shape, being a polygon having an infinite number of sides. Nevertheless, a cube is a preferred geometrical configuration for the present inventive machine.

Additionally, main frame 10 may comprise a variety of materials, including, for example, cast iron, welded steel, or cast polymer commonly referred to as granitan. The structure, once cast, can be efficiently and accurately machined on the sides of the cube that will be utilized for the desired machine functions. For example, utilizing a horizontal machining center equipped with an accurate fourth axis indexer, four adjacent sides can be accurately machined in one set-up giving the main frame the necessary geometric configuration and geometric accuracies needed in a machine tool. The remaining two sides, i.e., base 12 and upper face 16, can be machined in a second set-up if needed. Furthermore, main frame 10 may be double walled cast, and the void between the walls may be filled with a vibration dampening material.

Figure 2A:
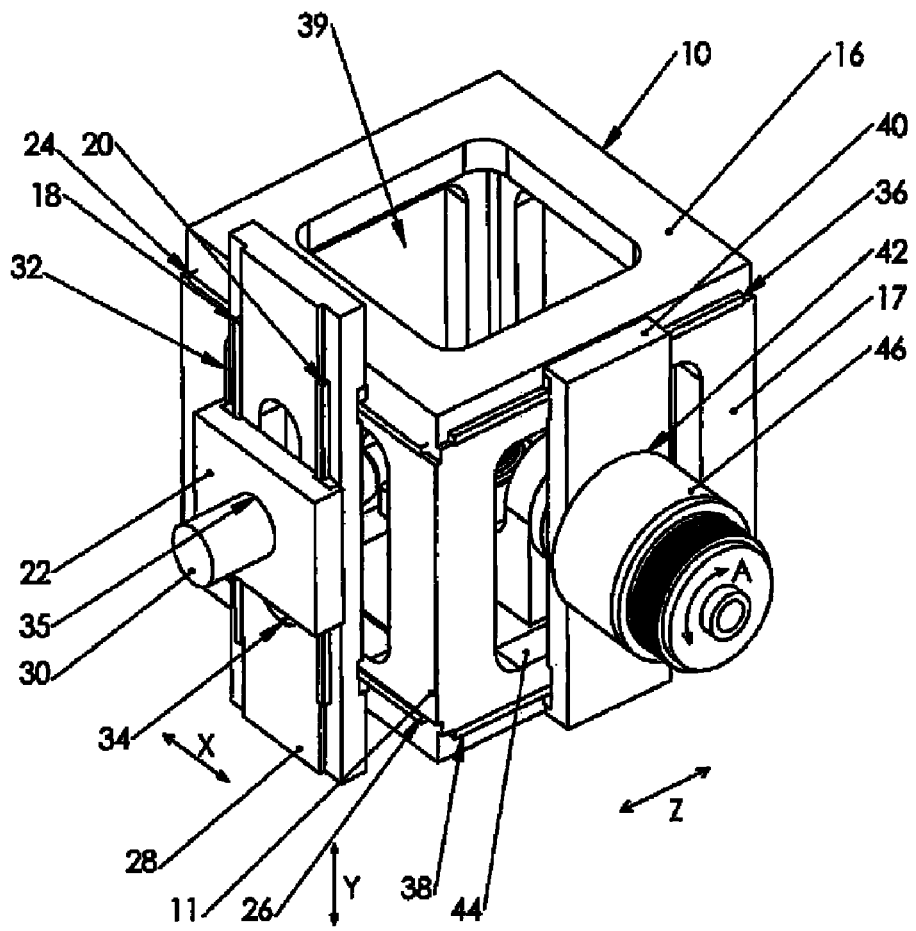
FIGS. 2a and 2b are schematics illustrating an exemplary multi-axes contouring machine in one embodiment of the present invention.

FIG. 2 is a schematic illustrating an exemplary multi-axes contouring machine providing movement along 5 axes. In the 5 axes configuration, the intended purpose is to allow for freedom of part position and full 5 axes simultaneous contouring. Referring to FIG. 2a, side 11 of main frame 10 comprises rails 24 and 26 over which a carriage 28 slides, corresponding to movement along an X axis. Carriage 28, in turn, comprises rails 18 and 20 over which a carriage 22 slides, corresponding to movement along a Y axis.

Both carriages 22 and 28 have a cutout 35 and 34 respectively at their bisecting points which allow for entry of a spindle 30. Spindle 30 is mounted to carriage 22, which moves in the Y axis direction, and carriage 22 is mounted to carriage 28 which moves in the X axis direction. Side 11 and carriage 28 both have a cutout 32 and 34 respectively, suitably cut out to allow spindle 30 to move freely along the X and Y axes, thereby following the respective movements of carriages 22 and 28.

Furthermore, side 17 of main frame 10, which is adjacent to side 11, comprises rails 36 and 38 over which a carriage 40 slides, wherein such movement by carriage 40 corresponds to movement along a Z axis. Carriage 40 and side 17 both comprise a cutout, 42 and 44 respectively, through which a rotary 46 extends. Rotary 46 is positioned perpendicularly to spindle 30, and rotates along an A axis.

Figure 2B:
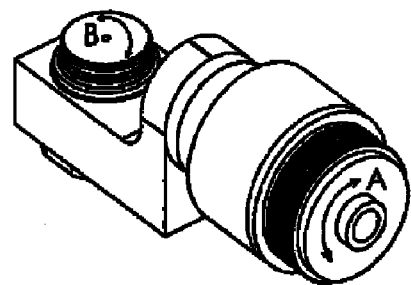

Furthermore, referring to FIG. 2b, attached to rotary 46 is a rotary 47, which moves along a B axis, i.e., the 5$^{th}$ axis of motion in this embodiment. The degree to which rotary 46 extends into a cavity 39 formed by sides 11, 13, 15, and 17, and by base 12 and upper face 16 of main frame 10, is determined by the purpose of the machine.

Figure 3:
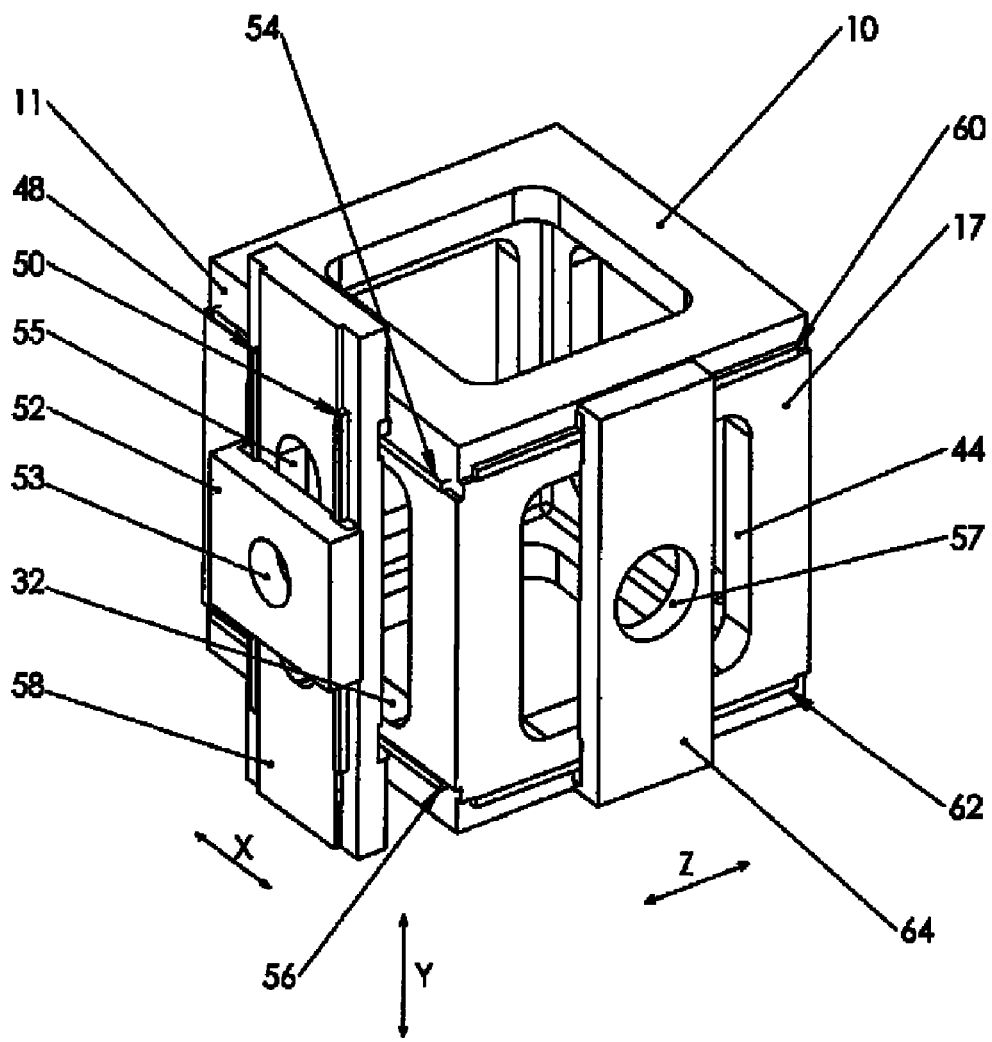
FIG. 3 is a schematic illustrating an exemplary multi-axes contouring machine in another embodiment of the present invention.

FIG. 3 is a schematic illustrating a three-axes contouring machine. Here, the machine comprises main frame 10 identical to the main frame discussed above in relation to FIGS. 1 and 2. Side 11 of main frame 10 comprises rails 54 and 56 over which a carriage 58 is mounted and slides, corresponding to movement along an X axis. Carriage 58, in turn, comprises rails 48 and 50 over which a carriage 52 slides, corresponding to movement along a Y axis. Both carriages 58 and 52 have a cutout 53 and 55 respectively at their bisecting points, and are aligned with cutout 32 on side 11. Furthermore, side 17 of main frame 10 comprises rails 60 and 62 over which a carriage 64 is mounted and slides, corresponding to movement along a Z axis. Carriage 58, which moves along the X axis, then, moves perpendicularly in relation to the movement of carriage 52, which moves along the Y axis, and perpendicularly in relation to the movement of carriage 64, which moves along the Z axis. Carriage 64 comprises a cutout 57, which is aligned with cutout 44 on side 17.

Figure 4:
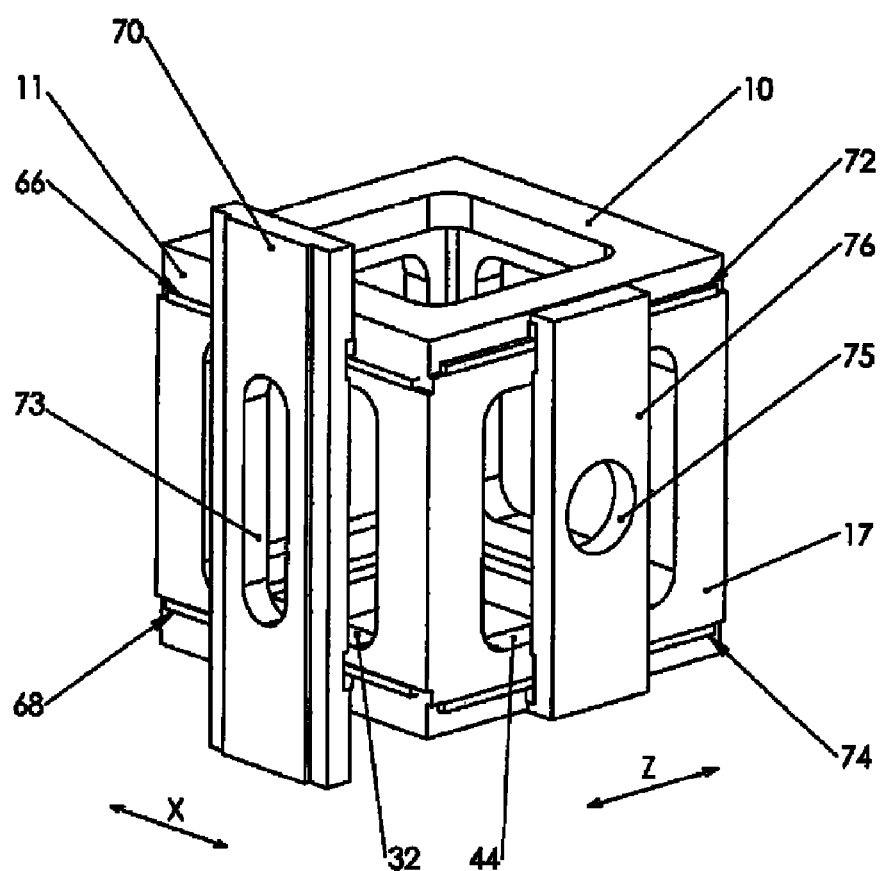
FIG. 4 is a schematic illustrating an exemplary multi-axes contouring machine in another embodiment of the present invention.

FIG. 4 is a schematic illustrating a two-axes contouring machine. Here, the machine comprises main frame 10 identical to the main frame discussed above in relation to FIGS. 1-3. Additionally, side 11 of main frame 10 comprises rails 66 and 68 onto which a carriage 70 is mounted and slides, corresponding to movement along an X axis. Side 17 of main frame 10 comprises rails 72 and 74 onto which a carriage 76 is mounted and slides, corresponding to movement along a Z axis. Carriage 70, which moves along the X axis, then, moves perpendicularly in relation to the movement of carriage 76 along the Z axis. Each of carriages 70 and 76 comprises a cutout 73 and 75 respectively which is respectively aligned with respective cutouts 32 and 44 of sides 11 and 17.

The contouring machine of the present invention provides a unique mechanism whereby a workpiece can be contoured and shaped, particularly utilizing superabrasive machining parts and working under superabrasive machining operating conditions, wherein the workpiece can be held and moved along one or more axes while it is simultaneously contoured by a machining part, which is held and moved along one or more axes. For example, referring to FIG. 6, which depicts the interior view of the machine depicted in FIG. 2, but which applies in basic principle and design to the machines depicted in FIGS. 3-5, a workpiece 100, which is to be machined, is secured to rotary 47, which moves along a B axis. Again, rotary 47 is connected to rotary 46, which moves along an A axis, wherein rotary 47 is mounted to carriage 40, which moves along a Z axis. Accordingly, workpiece 100 is capable of movement along three different axes: A, B, and/or Z. Importantly, it is noted that workpiece 100 is held entirely by rotary 47, thereby eliminating the need for a conventional work table. It is also noted, that workpiece 100 may be held by rotary 46, where rotary 47 is not used, or by any other machining part that is actuated by the carriages and which is capable of securely holding workpiece 100. Workpiece 100 may be held on the rotary with a custom fixture mounted on a standard pallet.

Extending through cutout 32 of side 11 is a superabrasive grinding wheel 102, such, as for example, an electroplated cubic boron nitride wheel, capable of operating at superabrasive machining conditions of up to about 24,000 feet per minute. Grinding wheel 102 is mounted to spindle 30. Mounting may be accomplished via a standard wheel adapter. Directly positioned over grinding wheel 102 and mounted to an interior wall of side 11 is a coolant nozzle 104, which supplies coolant to grinding wheel 102. The machine is further equipped with an X axis motor 106, a Y axis motor 108, and a Z axis motor (not shown), all located on the outside of main frame 10, wherein the motors drive the movement of the respective axis-oriented carriages along their respective axes.

Figure 5:
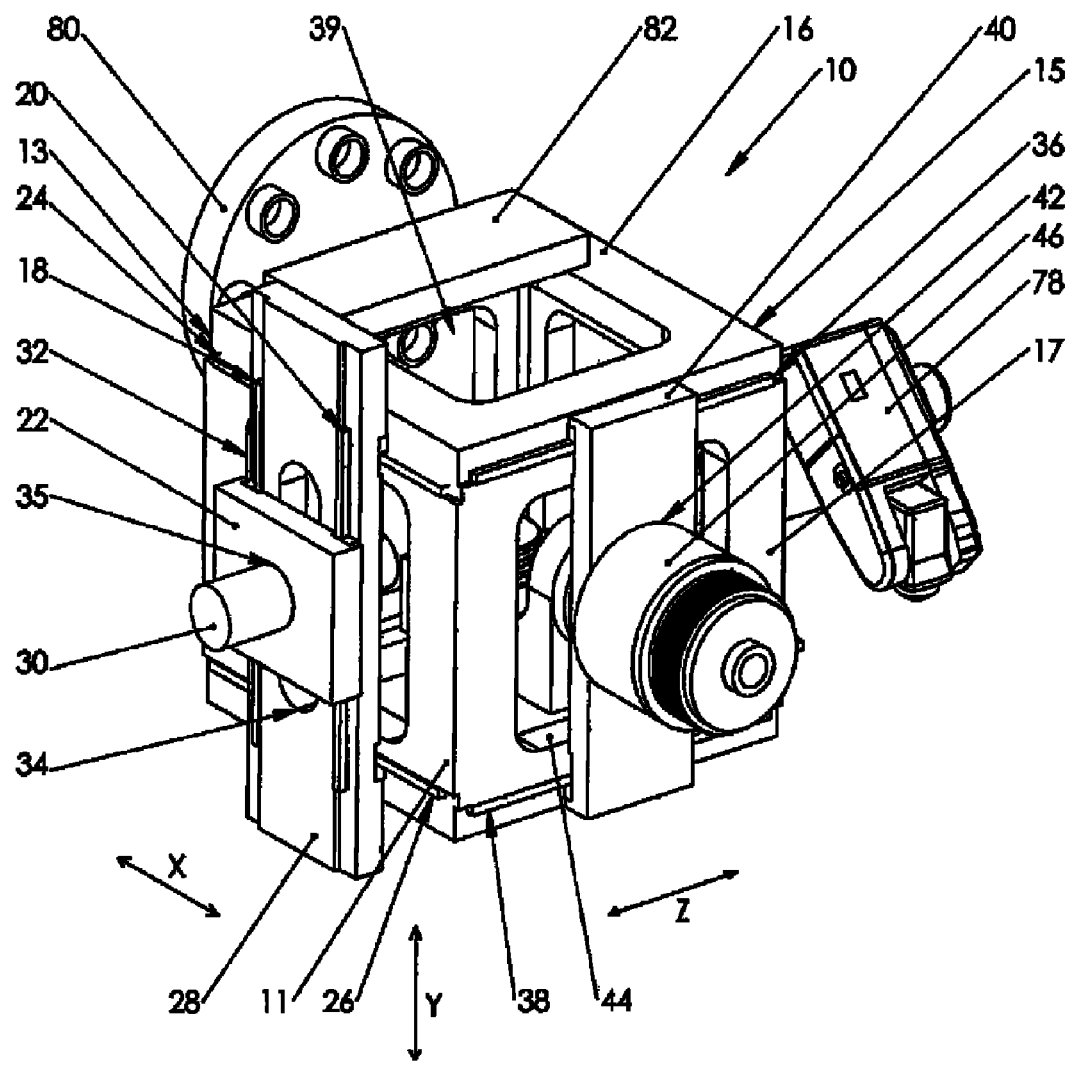
FIG. 5 is a schematic illustrating an exemplary multi-axes contouring machine in another embodiment of the present invention.
Figure 6:
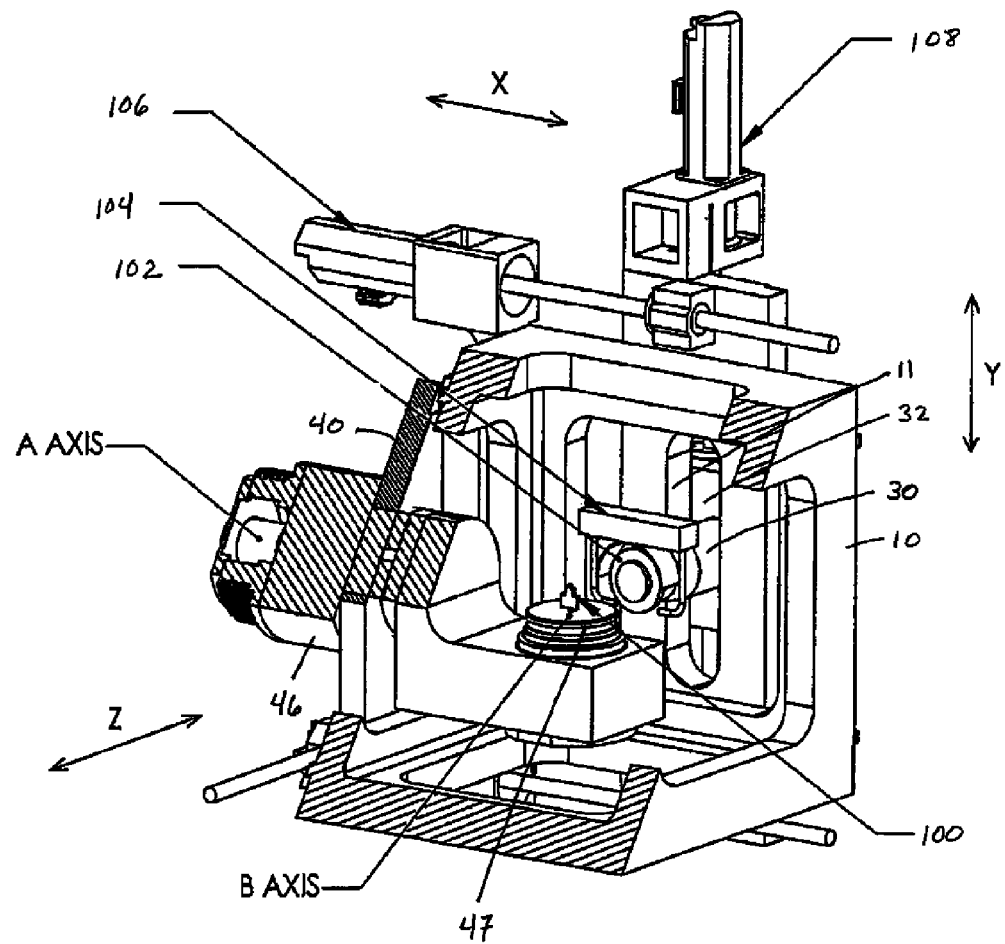
FIG. 6 is a schematic illustrating an interior view of the exemplary multi-axes contouring machine depicted in FIGS. 2a and 2b.

In addition to being capable of contouring a workpiece simultaneously over two or more axes of motion, the contouring machine of the present invention is also capable of holding peripheral machining parts on its main frame. For example, FIG. 5 illustrates the five-axes contouring machine discussed above in relation to FIG. 2, further comprising peripheral machining parts, including, a motion robotic part loader 78 disposed on side 15 of main frame 10, a tool and wheel changer 80 disposed on side 13 of main frame 10, and a wheel dresser 82 disposed on upper face 16 of main frame 10. Although FIG. 5 depicts the disposition of the peripheral machining parts on the machine discussed above in relation to FIG. 2, it is contemplated that such peripheral machining parts may be disposed on any of the main frames of the machines disclosed herein or on machines being natural variants of the disclosed machines. Additionally, the peripheral machining parts are not to be limited in position or type to those disclosed herein, as any machining part useful in the industry and capable of being attached to the sides of the main frame disclosed herein is contemplated herein.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A contouring machine for a superabrasive machining of a workpiece, comprising:
   a main frame comprising an upper face, a base, a first side, and a second side, the first and second sides abutting each other and fixing the upper face and the base in spaced non-movable, relationship, and the first side and the second side having an opening formed therethrough for permitting access into a cavity of the main frame;
   a first pair of guide rails projecting from the first side and slidably supporting a first carriage positioned over the opening of the first side during a motion of the first carriage along a first axis, the first carriage having an opening formed therethrough, wherein a machining part is actuated by the first carriage such that a motion of the machining part is along the first axis; and
   a second pair of guide rails projecting from the second side and slidably supporting a second carriage positioned over the opening of the second side during a motion of the second carriage along a second axis, the second carriage having an opening formed therethrough, wherein the workpiece is actuated by the second carriage such that a motion of the workpiece is along the second axis;

a spindle disposed through the openings of the first side and the first carriage, wherein the spindle holds the machining part within the cavity of the main frame;

a first rotary disposed through the openings of the second carriage and the second side and into the cavity of the main frame, wherein the first rotary rotates in a clockwise or a counterclockwise direction along a third axis, wherein the workpiece is actuated by the first rotary such that the motion of the workpiece is along the third axis; and a second rotary in communication with the first rotary and extending into the cavity of the main frame, wherein the second rotary rotates in a clockwise or a counterclockwise direction along a fourth axis, wherein the fourth axis is perpendicular to the third axis, and wherein the workpiece is actuated by the second rotary such that the motion of the workpiece is along the fourth axis.

2. A contouring machine for a superabrasive machining of a workpiece, comprising:

a main frame comprising an upper face, a base, a first side, and a second side, the first and second sides abutting each other and fixing the upper face and the base in spaced non-movable, relationship, and the first side and the second side having an opening formed therethrough for permitting access into a cavity of the main frame;

a first pair of guide rails projecting from the first side and slidably supporting a first carriage positioned over the opening of the first side during a motion of the first carriage along a first axis, the first carriage having an opening formed therethrough, wherein a machining part is actuated by the first carriage such that a motion of the machining part is along the first axis; and a second pair of guide rails projecting from the second side and slidably supporting a second carriage positioned over the opening of the second side during a motion of the second carriage along a second axis, the second carriage having an opening formed therethrough, wherein the workpiece is actuated by the second carriage such that a motion of the workpiece is along the second axis;

a third pair of guide rails projecting from the first carriage and slidably supporting a third carriage above the opening in the first carriage, the third carriage movable along a third axis, and wherein the third carriage comprises an opening formed therethrough, and further wherein the machining part is actuated by the third carriage such that the motion of the machining part is along the third axis;

a spindle disposed through the openings of the first side, the first carriage, and the third carriage, wherein the spindle holds the machining part within the cavity of the main frame;

a first rotary disposed through the openings of the second carriage and the second side, wherein the first rotary rotates in a clockwise or a counterclockwise direction along a fourth axis, wherein the workpiece is actuated by the first rotary such that the motion of the workpiece is along the fourth axis; and a second rotary in communication with the first rotary and extending into the cavity of the main frame, wherein the second rotary rotates in a clockwise or a counterclockwise direction along a fifth axis, wherein the fifth axis is perpendicular to the fourth axis, and wherein the workpiece is actuated by the second rotary such that the motion of the workpiece is along the fifth axis.

3. The contouring machine of claim 2, wherein the machining part comprises a superabrasive tool.

4. The contouring machine of claim 3, wherein the superabrasive tool comprises a cubic boron nitride grinding wheel.

5. The contouring machine of claim 2, wherein the contouring machine further comprises one or more peripheral machining parts, and one or more additional sides, wherein the one or more additional sides fixes the upper face and the base in spaced non-movable, relationship, the one or more additional sides having an opening formed therethrough for permitting access into the main frame, and wherein the one or more additional sides accommodate the one or more peripheral machining parts via the respective openings.

6. The contouring machine of claim 5, wherein the one or more peripheral machining parts comprise a motion robotic part loader, a tool and wheel changer, and a wheel dresser.

7. A method of machining a workpiece using a contouring device, wherein the contouring device comprises:

a main frame comprising an upper face, a base, a first side, and a second side, the first and second sides abutting each other and fixing the upper face and the base in spaced non-movable, relationship, and the first side and the second side having an opening formed therethrough for permitting access into a cavity of the main frame;

a first pair of guide rails projecting from the first side and slidably supporting a first carriage positioned over the opening of the first side during a motion of the first carriage along a first axis, the first carriage having an opening formed therethrough, wherein a machining part is actuated by the first carriage such that a motion of the machining part is along the first axis;

a second pair of guide rails projecting from the second side and slidably supporting a second carriage positioned over the opening of the second side during, a motion of the second carriage along a second axis, the second carriage having an opening formed therethrough, wherein the workpiece is actuated by the second carriage such that a motion of the workpiece is along the second axis;

a first rotary disposed through the openings of the second carriage and the second side and into the cavity of the main frame, wherein the first rotary rotates in a clockwise or a counterclockwise direction along a third axis, and wherein applying the machining part to the workpiece further comprises actuating the first rotary, thereby moving the workpiece along the third axis simultaneously to moving the machining part along the first axis; and a second rotary attached to the first rotary and extending into the cavity of the main frame, wherein the second rotary rotates in a clockwise or a counterclockwise direction along a fourth axis, wherein the fourth axis is perpendicular to the third axis, and wherein applying the machining part to the workpiece further comprises actuating the second rotary, thereby moving the workpiece along the fourth axis simultaneously to moving the machining part along the first axis;

wherein the method comprises:

holding the workpiece within the cavity of the main frame;

affixing the machining part onto a spindle, wherein the spindle is positioned through the openings of the first side and the first carriage; and applying the machining part to the workpiece, wherein applying the machining part to the workpiece comprises actuating the first and second carriages, thereby moving the machining part along the first axis simultaneously to moving the workpiece along the second axis.

8. The method of claim 7, wherein the contouring device further comprises a third pair of guide rails projecting from the first carriage and slidably supporting a third carriage above the opening in the first carriage, the third carriage being capable of a motion along a fourth axis, and wherein the third carriage comprises an opening formed therethrough, and wherein applying the machining part to the workpiece further comprises moving the machining part along the fourth axis while the workpiece is moving along the second axis.

9. The method of claim 7, wherein the machining part comprises a superabrasive tool.

\* \* \* \* \*